United States Patent
Scarborough

(10) Patent No.: US 6,701,635 B2
(45) Date of Patent: Mar. 9, 2004

(54) TAPE MEASURE THAT INCORPORATES A MARKING DEVICE

(75) Inventor: Dane Scarborough, Hailey, ID (US)

(73) Assignee: Irwin Industrial Tool Company, Huntersville, NC (US)

(*) Notice: Subject to any disclaimer, the term of this patent is extended or adjusted under 35 U.S.C. 154(b) by 0 days.

(21) Appl. No.: 10/195,945

(22) Filed: Jul. 15, 2002

(65) Prior Publication Data

US 2003/0110655 A1 Jun. 19, 2003

Related U.S. Application Data

(60) Provisional application No. 60/342,146, filed on Dec. 18, 2001, and provisional application No. 60/360,698, filed on Feb. 28, 2002.

(51) Int. Cl.[7] .................................................. G01B 3/10
(52) U.S. Cl. .............................. 33/761; 33/668; 33/42; 7/163
(58) Field of Search ................................ 33/34, 35, 36, 33/37, 42, 668, 755, 759, 760, 761, 768; 7/163; 30/276, 319, 347

(56) References Cited

U.S. PATENT DOCUMENTS

| | | | | |
|---|---|---|---|---|
| 259,556 A | * | 6/1882 | Kulman ..................... 33/761 |
| 491,715 A | * | 2/1893 | Mondor ..................... 7/163 |
| 2,021,275 A | * | 11/1935 | Warner ..................... 33/36 |
| 2,624,120 A | * | 1/1953 | Mills ..................... 33/42 |
| 2,649,787 A | | 8/1953 | Kobayashi | |
| 2,763,929 A | * | 9/1956 | Metcalf ..................... 33/42 |
| 3,063,157 A | | 11/1962 | Keene | |
| 3,526,964 A | | 9/1970 | Clark | |
| 3,731,389 A | | 5/1973 | King | |
| 4,015,337 A | | 4/1977 | Taylor | |
| 4,439,927 A | | 4/1984 | Elliott | |
| 4,542,589 A | | 9/1985 | Yamamoto | |
| 4,551,847 A | | 11/1985 | Caldwell | |
| 4,630,376 A | | 12/1986 | Pentecost | |
| 4,649,649 A | | 3/1987 | Fain | |
| 4,667,412 A | | 5/1987 | Carlson | |
| 4,729,171 A | | 3/1988 | Samson | |
| 4,760,648 A | | 8/1988 | Doak et al. | |
| 4,965,941 A | | 10/1990 | Agostinacci | |
| 4,989,326 A | | 2/1991 | O'Malley | |
| 5,416,978 A | | 5/1995 | Kaufman ..................... 33/770 |
| 5,430,952 A | | 7/1995 | Betts ..................... 33/760 |
| 5,435,074 A | | 7/1995 | Holevas et al. ............. 33/668 |
| 5,477,619 A | | 12/1995 | Kearns ..................... 33/668 |
| 5,505,133 A | | 4/1996 | Chen ..................... 101/375 |
| 5,577,329 A | | 11/1996 | States ..................... 33/768 |
| 5,671,543 A | | 9/1997 | Sears ..................... 33/668 |
| 5,735,052 A | | 4/1998 | Lin ..................... 33/27.03 |
| 5,809,662 A | | 9/1998 | Skinner ..................... 33/768 |
| 5,815,939 A | | 10/1998 | Ruffer ..................... 33/760 |
| 5,829,152 A | | 11/1998 | Potter et al. ............. 33/668 |
| 6,041,513 A | | 3/2000 | Doak ..................... 33/668 |
| 6,178,655 B1 | | 1/2001 | Potter et al. ............. 33/668 |
| 6,212,787 B1 | | 4/2001 | Dixon ..................... 33/759 |
| 6,363,622 B1 | | 4/2002 | Stratton ..................... 33/761 |
| 6,513,261 B2 | * | 2/2003 | Johnson ..................... 33/668 |
| 6,547,098 B1 | * | 4/2003 | Kaye ..................... 30/162 |
| 2001/0029673 A1 | | 10/2001 | Brown et al. ............. 30/293 |
| 2002/0129511 A1 | * | 9/2002 | Laughlin et al. ......... 33/770 |

FOREIGN PATENT DOCUMENTS

US  WO 02/08687 A1  1/2002

* cited by examiner

Primary Examiner—G. Bradley Bennett
(74) Attorney, Agent, or Firm—Frank J. Dykas; Robert L. Shaver; Stephen M. Nipper

(57) ABSTRACT

A tape measure that incorporates a marking device for allowing an individual to measure and mark a wide variety of materials in a more efficient and economical manner, and for measuring and marking the beginning point of reference and the measured position point simultaneously. The tape measure has a housing, a coiled measuring tape, a tape tip, and a marker having a marking wheel mounted on an axle.

7 Claims, 20 Drawing Sheets

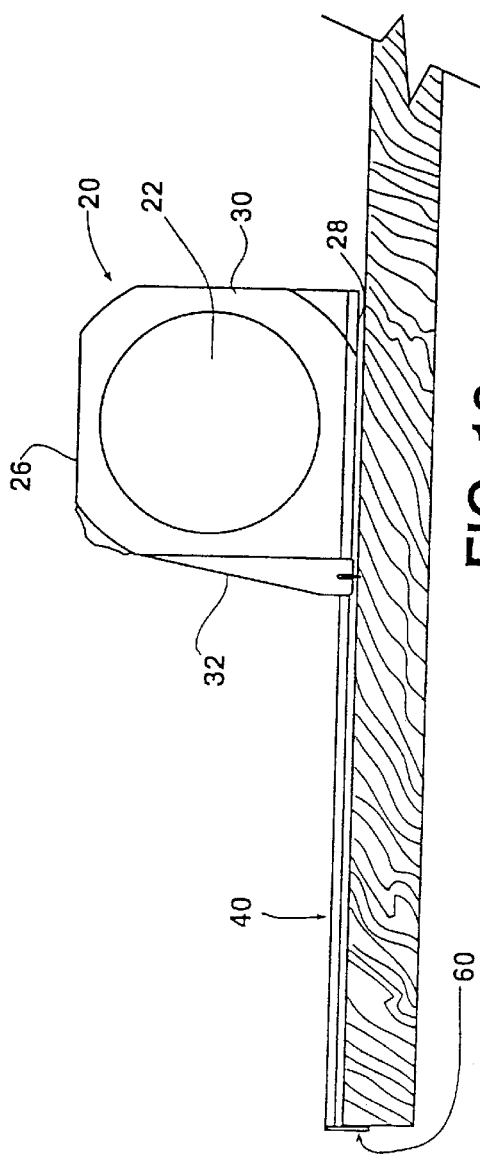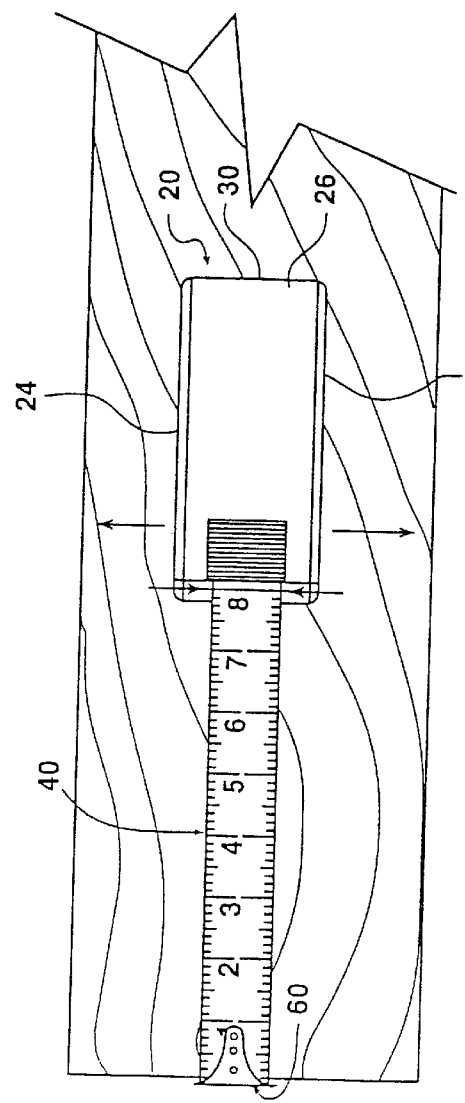

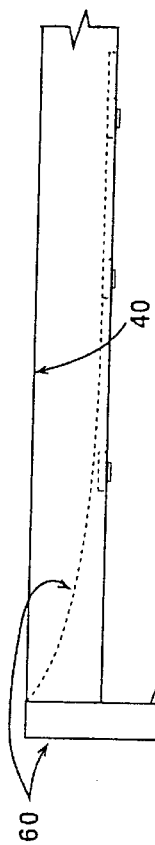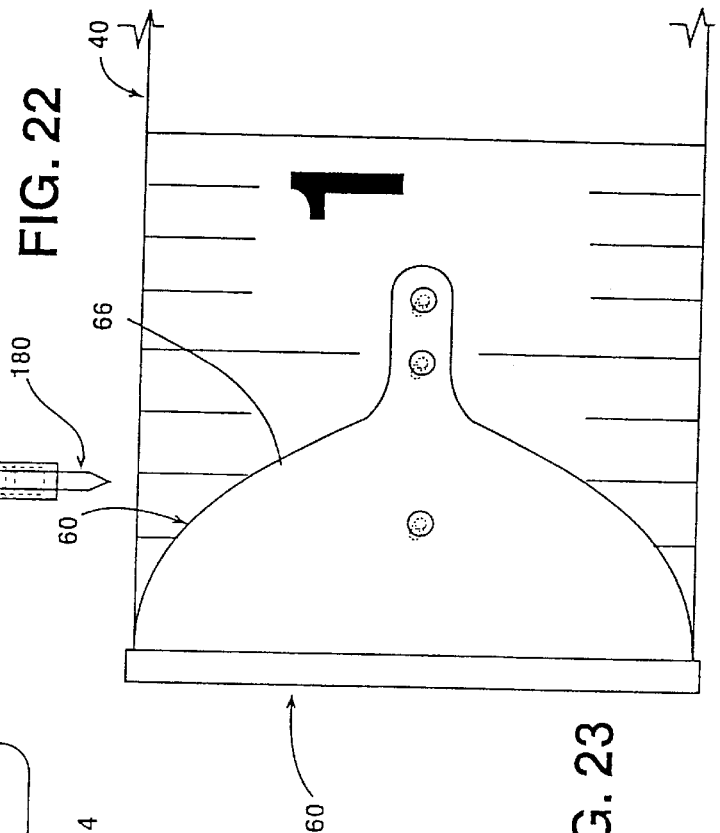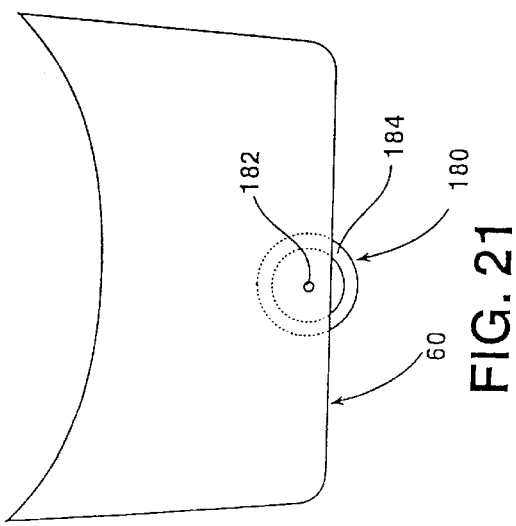
FIG. 22
FIG. 23
FIG. 21

TAPE MEASURE THAT INCORPORATES A MARKING DEVICE

PRIORITY

This application claims the priority date of the provisional application entitled Tape Measure that Incorporates a Marking Device filed by Dane Scarborough on Dec. 18, 2001, with Ser. No. 60/342,146, as well as the provisional application entitled Tape Measure that Incorporates a Marking Device filed by Dane Scarborough on Feb. 28, 2002 with Ser. No. 60/360,698.

BACKGROUND OF THE INVENTION

1. Field of the Invention

The present invention relates generally to measuring devices and more specifically it relates to a tape measure that incorporates a marking device for allowing an individual to measure and mark a wide variety of materials in a more efficient and economical manner.

2. Description of the Prior Art

Various different forms and types of measuring devices are known to the prior art. One particular type of measuring device is known as a "tape measure." Tape measures typically comprise a flexible tape resiliently coiled within a housing. The tape is normally printed with incremental measuring marks for measuring distances. In use, the flexible tape is uncoiled and extended from the housing and placed on a surface to be measured. Distances can then be marked with a separate marking tool, such as a pencil, directly onto the surface measured.

Numerous devices incorporating marking tools inside and outside the tape measure housing are known in the prior art. These include devices which are affixed to existing tape measure housings, for instance the self adhesive scoring attachment of U.S. Pat. No. 6,041,513 (Doak).

These devices also include marking tools which are affixed to belt clips of existing tape measure housings. In example, U.S. Pat. No. 4,760,648 (Doak et al.) Which discloses a marking device adapted to be mounted on one side of the tape measure, namely as a replacement belt clip.

These devices also include housings configured for receipt therethrough of marking means, such as pencils or pens. In example, U.S. Pat. No. 5,735,052 (Lin) discloses a tape measure having formed therein a passage for receiving therethrough the marking means.

These devices also include marking tools which are integral with the tape measure housing. For instance, U.S. Pat. No. 5,435,074 (Holevas et al.) discloses a tape measure having a marker attached to the tape measure's lock so that depression of the lock mechanism also extends the marker out of the housing of the tape measure. Also, U.S. Pat. No. 4,015,337 (Taylor) discloses a marking device integrally formed into the housing of the tape measure.

These devices can also include scoring means rather than marking (ink, graphite, etc.) means. For instance, U.S. Pat. No. 2,649,787 (Kobayashi), U.S. Pat. No. 3,063,157 (Keene), and U.S. Pat. No. 3,526,964 (Clark, Jr.).

The main problems with these conventional measuring devices are maintenance, inaccuracy and lack of versatility.

Prior art working means include the use of pencils, pens, scribes, chalk, and/or crayons. These methods of marking require continued maintenance in the form of refilling, sharpening, and/or adjusting the height or position of the marking instrument. Every time these marking means are subject to routine maintenance, inaccuracies become possible.

Another disadvantage is the fact that these methods for marking are limited in the scope of materials they can mark. For example, it is difficult to use a pencil, pen, or scribe to mark glass or ceramic tile. Conversely, it would not be preferable to use a felt marker or pen to mark material that will receive a clear finish or a painted finish wherein the mark of the pen or marker may bleed through the finish.

Another problem with conventional measuring devices are the number of procedures required to complete the task of measuring and marking materials accurately. These prior art devices require that the tape measure blade be locked into position prior to the use of the marking device. For instance, the patent to Holevas et al. discussed above. Such use can require additional digital manipulation of the tape measure, and due to the contact of the locking mechanism to the blade, can cause the tape measure blade to shift from the desired position, thereby causing inaccuracies.

Other problems with conventional measuring devices are their size and complexity. Many prior art devices have protrusions that inhibit or eliminate the ability to carry the tape measure in the standard pouch or holder that is often provided on a carpenter's or tradesmen's tool belt. Furthermore, if the tip of the marking instrument is exposed, it can cause damage or harm to other objects, or it can be damaged itself.

Prior art measuring tapes with retractable marking instruments require a mechanical means to do so. This retraction means also requires additional moving parts. Additional moving parts increase cost, increase the number of procedures for use, as well as increase the probability of malfunction.

What is needed is a tape measure or marking device able to be utilized with a tape measure which is readily able to allow an individual to measure and mark a wide variety of materials in an efficient and economical manner; can be used for measuring and marking both the beginning point of reference and the measured position point simultaneously; requires little to no maintenance; is not prone to inaccuracy; is versatile; can be used to mark a wide variety of materials; is simple to use; is compact and not awkwardly shaped; and is not prone to damage when in or out of use.

In these respects, a tape measure that incorporates a marking device according to the present invention substantially departs from the conventional concepts and designs of the prior art, and in so doing provides an apparatus primarily developed for the above needs.

SUMMARY OF THE INVENTION

In view of the foregoing disadvantages inherent in the known types of measuring devices found in the prior art, the present invention provides a new tape measure that incorporates a marking device construction wherein the same can be utilized for allowing an individual to measure and mark a wide variety of materials in a more efficient and economical manner. Another purpose of the present invention is for measuring and marking the beginning point of reference and the measured position point simultaneously.

The general purpose of the present invention, which will be described subsequently in greater detail, is to provide a new tape measure that improves on the teachings of the prior art. In doing so, the present invention has many of the advantages of the measuring devices mentioned heretofore, and many novel features. The result is a new tape measure that incorporates a marking device which is not anticipated, rendered obvious, suggested, or even implied by any of the prior art measuring devices, either alone or in any combination thereof.

The present invention generally comprises a housing, a coiled measuring tape, a tape tip, a means for marking, an axle, a holder, preferably a means for locking the tape blade. The present invention is to be used on a surface to be measured and marked. The housing is preferably an elongated square or cylindrical shape or a combination thereof, having opposed side walls, a top wall, a bottom wall, a rear wall, and a front wall defining an enclosure. The front wall having therethrough a tape blade aperture. The bottom wall or a portion thereof may be angled in such a way as to allow for engagement of the tape tip to the surface being measured without initiating contact of the means for marking until it is intended.

The coiled measuring tape is an elongated blade formed of a ribbon of metal or composite material coiled on a means for a spool with a means to retract. The tape tip attaches to the end of the tape and is preferably a means for hooking, including a hook portion that extends at an essentially right angle from the mounting portion of the tape tip. The tape tip may include a mark making means that is separate and independent of the means for marking on the housing. The means for marking preferably has a circular shaped wheel and is preferably made of a rigid material such as metal, plastic or a mark making composite. The wheel preferably has an aperture for mating with an axle. This axle is preferably an elongated cylindrical shape.

The holder embodiment or marker enclosure is preferably an elongated tubular square in shape. It has a means of attachment to the housing in one embodiment. In another embodiment, it is integral with said housing. It preferably has a protruding cursor that is in alignment with a means for holding a marking wheel parallel to the face of the housing and perpendicular to the tape.

The means for locking the tape blade has a button section that protrudes to the exterior of the housing.

There has thus been outlined, rather broadly, the more important features of the invention so that the detailed description thereof may be better understood, and so that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a tape measure that incorporates a marking device that will overcome the shortcomings of the prior art devices.

An object of the present invention is to provide a tape measure that incorporates a marking device for allowing an individual to measure and mark a wide variety of materials in a more efficient and economical manner. Another purpose is for measuring and marking the beginning point of reference and the measured position point simultaneously.

Another object is to provide a tape measure that incorporates a marking device that is directional by nature when engaged with a surface to be measured.

Another object is to provide a tape measure that incorporates a marking device that can measure and mark two positions simultaneously.

Another object is to provide a tape measure that incorporates a marking device that does not require maintenance to the marking device.

Another object is to provide a tape measure that incorporates a marking device that can measure and mark with one hand operation in a single economical movement.

Another object is to provide a tape measure that incorporates a marking device that once engaged with the material being measured, will accurately hold its position while the mark is being made, without the use of an optional mechanical locking device.

Another object is to provide a tape measure that incorporates a marking device that can fit into a common tape pouch or holder on a carpenter's tool belt.

Another object is to provide a tape measure that incorporates a marking device that can engage material to be measured and marked without damaging the material to be marked.

Another object is to provide a tape measure that incorporates a marking device that in one embodiment, has no moving parts.

Another object is to provide a tape measure that incorporates a marking device that is interchangeable and/or replaceable with optional means for marking.

Another object is to provide a tape measure that incorporates a marking device that can cut a variety of materials.

Another purpose is for measuring and marking the beginning point of reference and the measured position point simultaneously.

To the accomplishment of the above and related objects, this invention may be embodied in the form illustrated in the accompanying drawings, attention being called to the fact, however, that the drawings are illustrative only, and that changes may be made in the specific construction illustrated.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

BRIEF DESCRIPTION OF THE DRAWINGS

Various other objects, features and advantages of the present invention will become fully appreciated as the same becomes better understood when considered in conjunction with the accompanying drawings, in which like reference characters designate the same or similar parts throughout the several views.

FIG. 19 is a side view of a sixth embodiment of the present invention engaged with a surface to be measured and marked.

FIG. 20 is an overhead view of the embodiment shown in FIG. 19 engaged with a to be measured and marked.

FIG. 21 is a front, close-up view of a tape tip containing a means for marking of some embodiment of the present invention.

FIG. 22 is a side, close-up view of a tape tip containing a means for marking of some embodiment of the present invention.

FIG. 23 is an overhead view of a tape tip of some embodiment of the present invention.

DESCRIPTION OF THE PREFERRED EMBODIMENT

Figure 1:
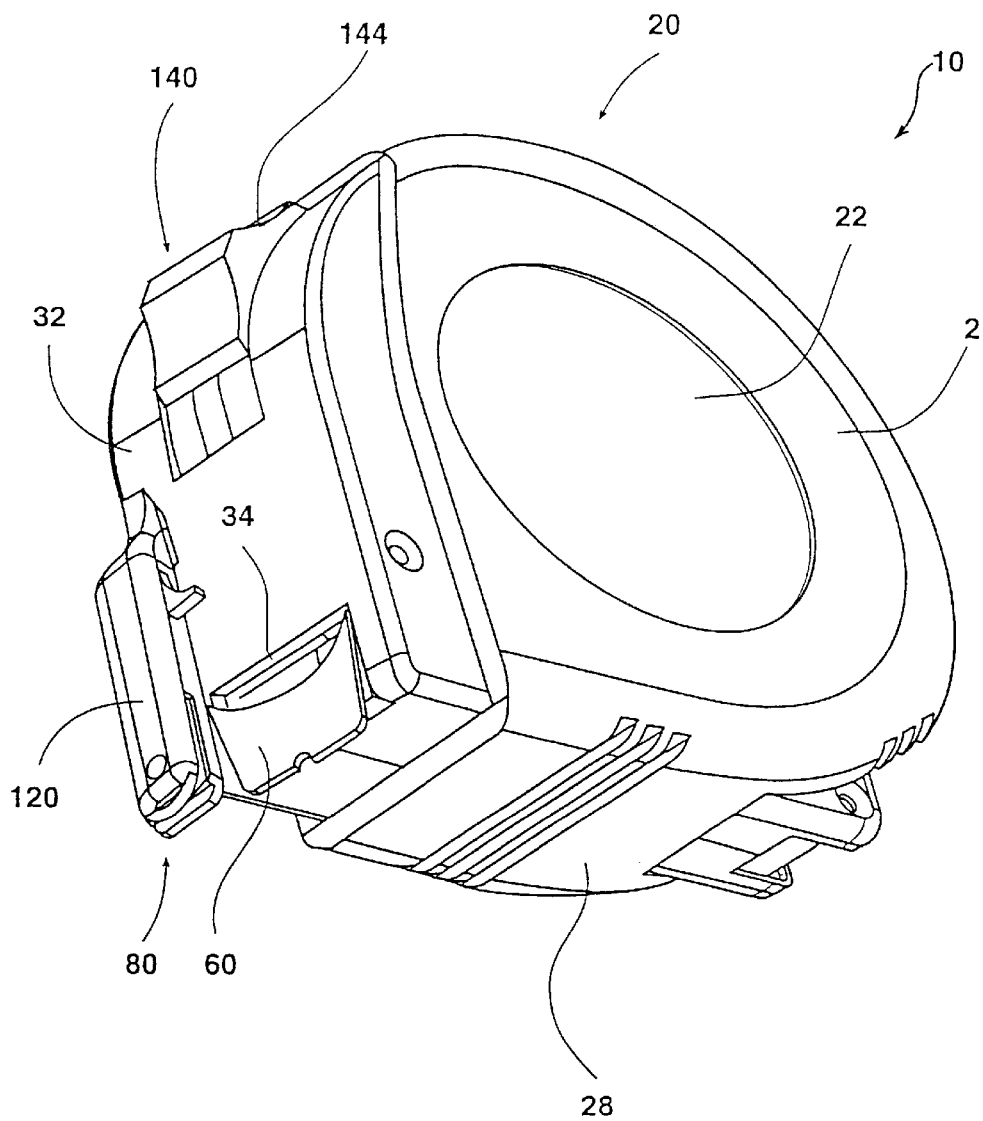
FIG. 1 is a perspective view of one embodiment of the present invention.
Figure 2:
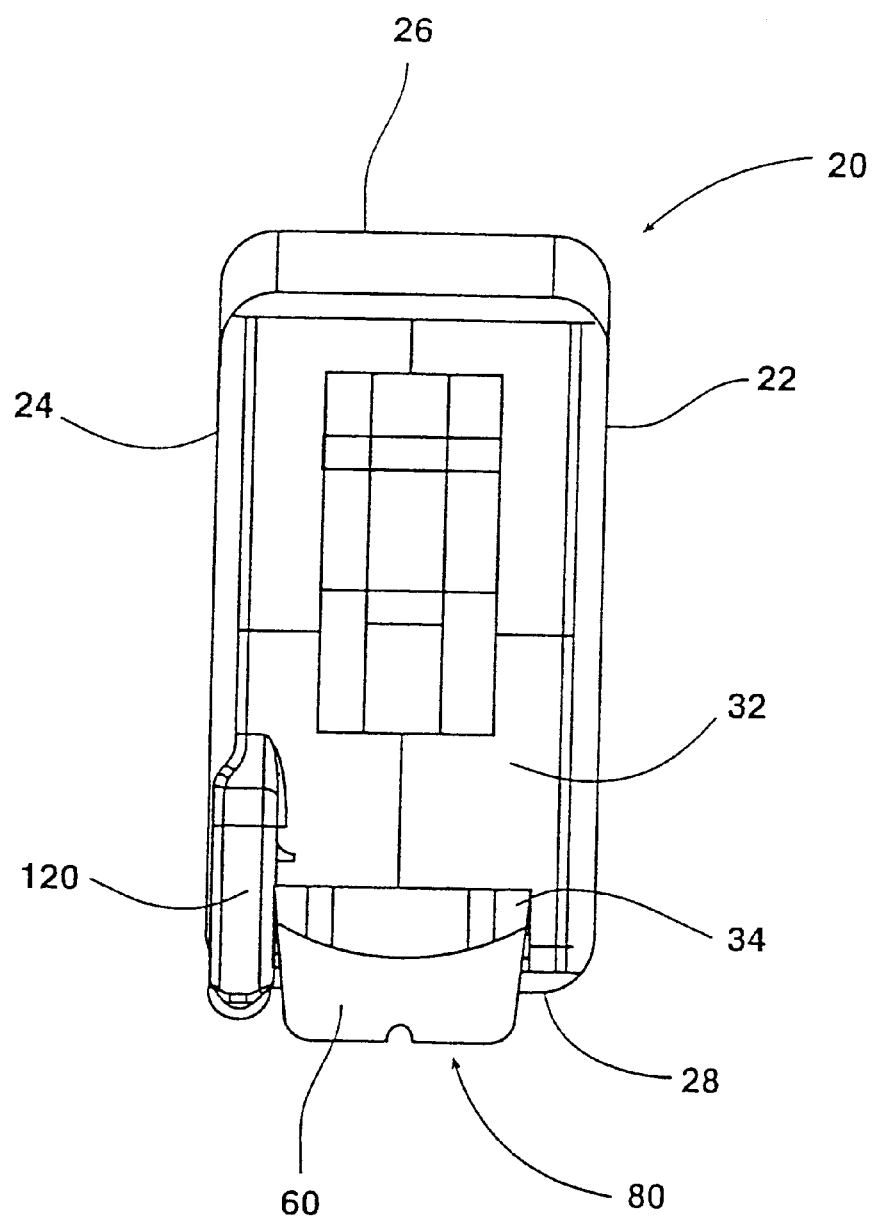
FIG. 2 is a front view of the embodiment shown in FIG. 1.
Figure 3:
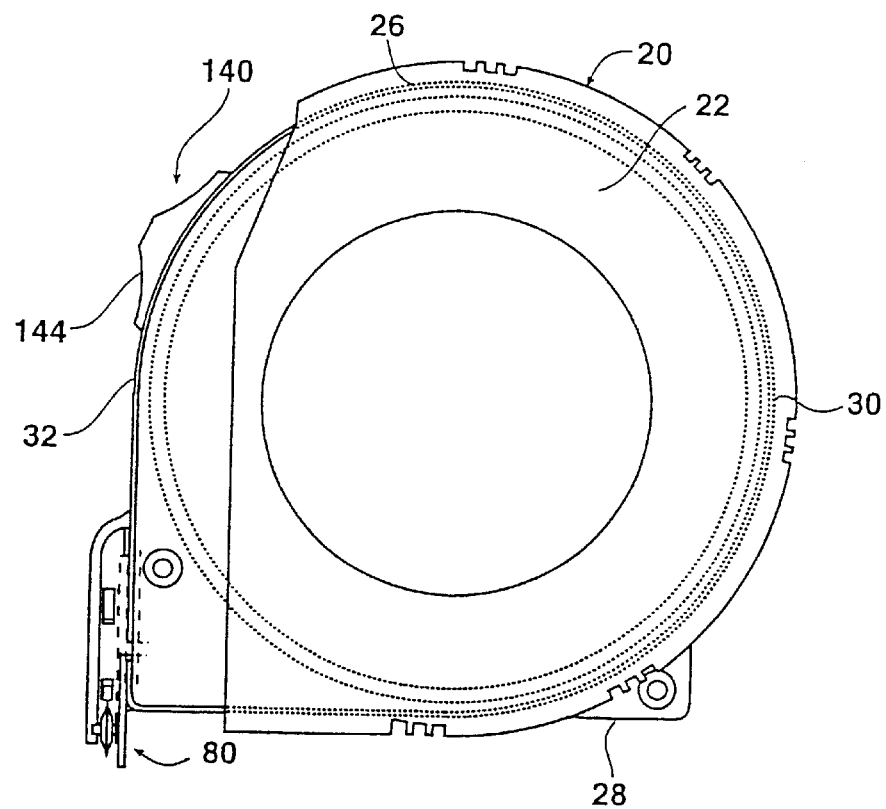
FIG. 3 is a side view of the embodiment shown in FIG. 1.
Figure 4:
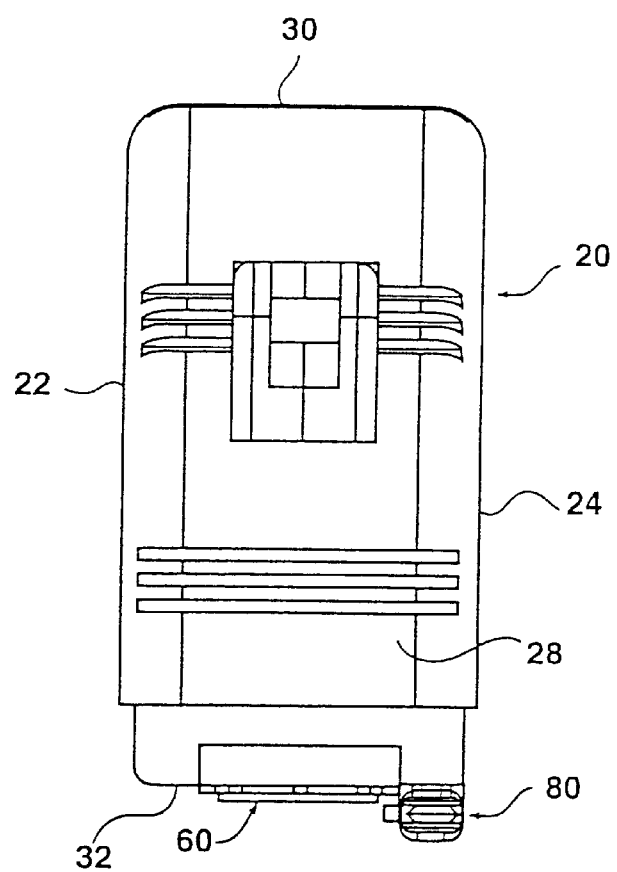
FIG. 4 is a bottom view of the embodiment shown in FIG. 1.

While the invention is susceptible of various modifications and alternative constructions, certain illustrated embodiments thereof have been shown in the drawings and will be described below in detail. It should be understood, however, that there is no intention to limit the invention to the specific forms or embodiments disclosed, but, on the contrary, the invention is to cover all modifications, alternative constructions, and equivalents falling within the spirit and scope of the invention as defined in the claims.

Turning now descriptively to the drawings in which similar reference characters denote similar elements throughout the several views, the attached figures illustrate embodiments of the present invention. In one embodiment, the present invention is a tape measure that incorporates a marking device. In another embodiment, the present invention comprises a marking device able to be attached to a tape measure.

Referring initially to FIGS. 1–5, shown is one embodiment of the present invention 10. This embodiment comprises a tape measure 2 incorporating a means for marking or "marking device" 80. This improved tape measure comprising a housing 20, a coiled measuring tape 40 having measuring indicia thereon, a tape tip 60, a marking device or means for marking 80, an axle 100, an "enclosure" or holder 120, and a means for locking the tape blade 140. The present invention is configured to be used upon a surface to be measured and marked 160.

The housing 20 is preferably an elongated square, a cylindrical shape or a combination thereof, as shown in the figures. Many different shapes and styles of tape measure housings are known to the prior art and may be configured for use with the present invention. The preferred housing 20 having opposed side walls 22, 24, a top wall 26, a bottom wall or base 28, a rear wall 30, and a front wall 32. These walls defining an enclosure for holding a wound tape blade. The front wall 32 having a tape blade aperture 34 therethrough for allowing a measuring tape blade to be extended.

In the preferred embodiment, the coiled measuring tape 40 is an elongated blade formed of a ribbon of metal or composite material coiled on a spooling means, such as a spool, with a retraction means, such as a spring mechanism. Such a coiled blade with spring tape measures are common in the prior art. The tape tip 60 or means for hooking is able to hook onto the edge of the surface to be marked, such as the edge of a board. This tape tip preferably including a hook portion 62 that extends at an essentially right angle from the mounting portion 66 of the tape tip 60. The use of the phrase "coiled measuring tape" is expressly intended to include all other means for measuring, including laser, proximity sensors, sonar, etc.

The holder or enclosure 120 of the means for marking 80 is preferably generally elongated square in shape or a combination thereof or any other shape that would effectively house a marking device. In some embodiments, the holder 120 comprises a means of attachment to the housing, whereas, in other embodiments the holder 120 may be integrally formed within the housing 20 of the tape measure.

Figure 5:
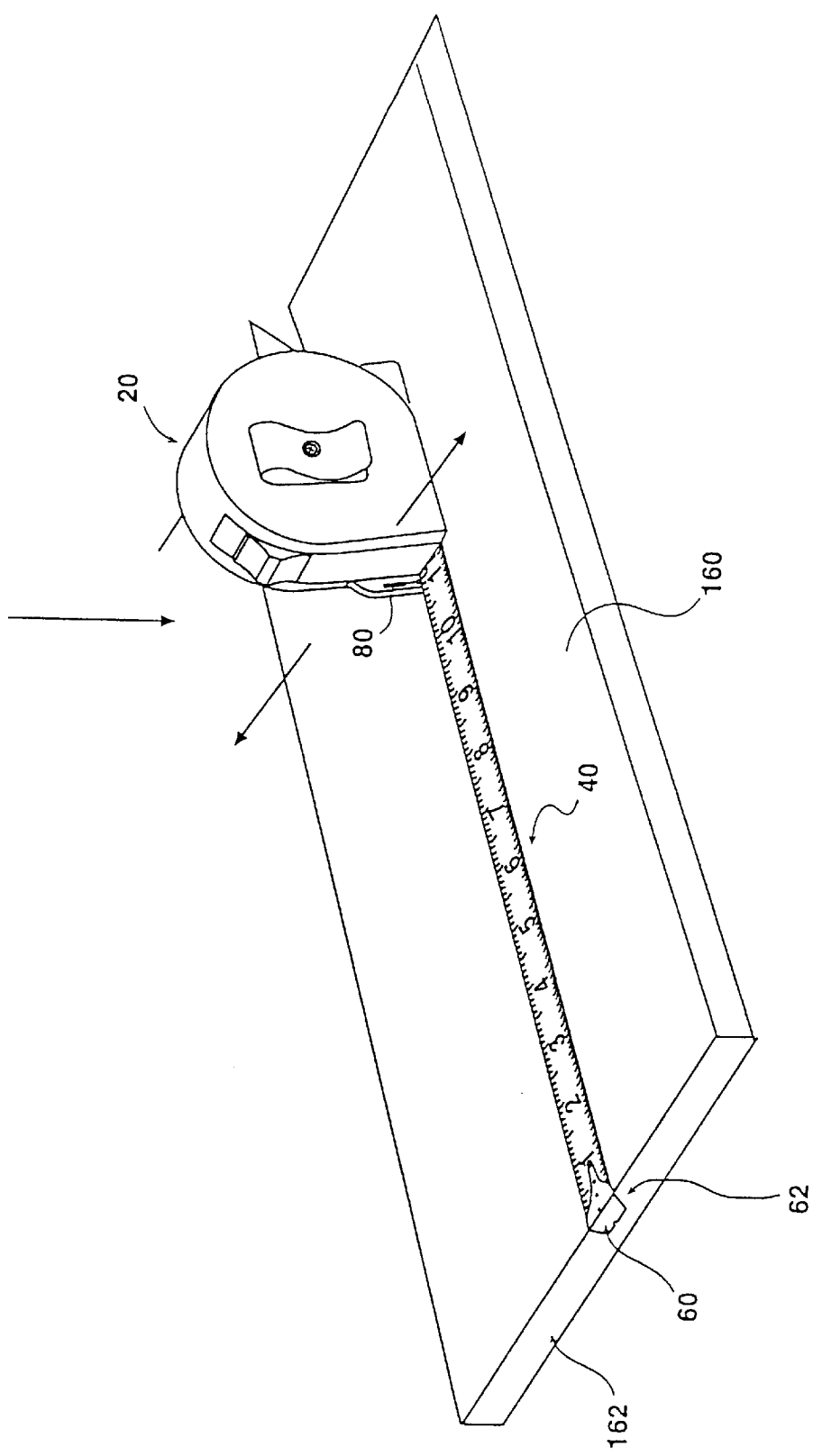
FIG. 5 is an environmental perspective view of the embodiment shown in FIG. 1.

In use, particularly as shown in FIG. 5, the tape tip 60 is hooked on the edge 162 of the surface to be measured 160. The housing 20 then moved away from the edge 162 thereby extending the tape 40. Side to side movement of the housing at the desired mark location results in the means for marking 80 making a mark on the surface to be measured and marked 162 which is generally perpendicular to the axis of the length of the tape 40.

As shown in FIGS. 25–30, the holder 120 may also have a protruding cursor 124 that is in alignment with the marking wheel or "impression wheel" 84 of the means for marking 80. Thus, the cursor 124 gives the user of the present invention an indication of where the marking wheel 84 of the means for marking 80 is aligned, thereby indicating the alignment of the mark to be made by the means for marking.

Referring back to FIGS. 1–5, the present invention 10 preferably also comprises a means for locking 140 the tape blade 40 in position. This means for locking 140 has a button section 144 that protrudes to the exterior of the housing 20. Means for locking tape blades of tape measures, in general, are known in the prior art. The means for locking 140 is completely optional, in that the present invention, unlike many of the prior art devices, will work absent such mean for marking. This is due to the fact that the marking means 80 is directional, able to create generally a straight line mark generally perpendicular to the extension of the measuring means. Thus, once the marking means is placed against the surface to be marked at the location of the mark to be made, the tape itself does not need to be locked into place, but could even be retracted. The present invention is superior over the prior art in that the marking process is as easy as extending the housing to the point to be marked, and marking the surface to be marked. No additional steps are required, for instance, the lock does not need to be engaged or the marking means engaged. Each additional step required can result in errors or variances in location of the marking means from the point intended to be marked. The present invention, in eliminating these additional steps, thereby results in a more accurate measurement.

It is preferred that the housing of the present invention be made of a rigid material such as metal, plastic, rubber, composite or a combination thereof. It is preferred that the tape blade of the present invention be made of a resilient material, such as metal, plastic or a composite. It is preferred that the marking wheel be made of a material able to itself leave or create a mark upon or into the surface to be marked. For instance, the wheel could be made of a hard metal, such as steel. The marking wheel could likewise be made of different materials for the different purposes discussed within this application, including, but not limited to metal, composites, rubber, plastic, natural materials, foam, etc. Likewise, the shape of the marking wheel can be as necessary, including but not limited to: rounded, flat, angled, sharpened, solid, porous, etc.

Referring now to FIG. 5, the tape tip of the present invention preferably includes a means for hooking the tape tip on the edge 162 of a surface to be measured 160. This means for hooking having a hook portion 62 that extends at an essentially right angle from the mounting portion 66 of the tape tip 60. Such tape tips are standard for tape measures in the prior art.

Figure 15:
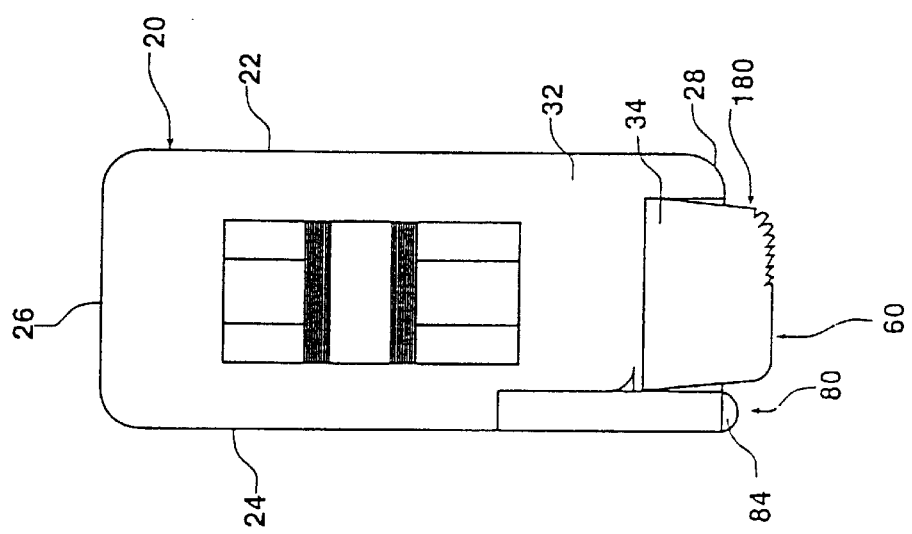
FIG. 15 is a front view of a fourth embodiment of the present invention.
Figure 17:
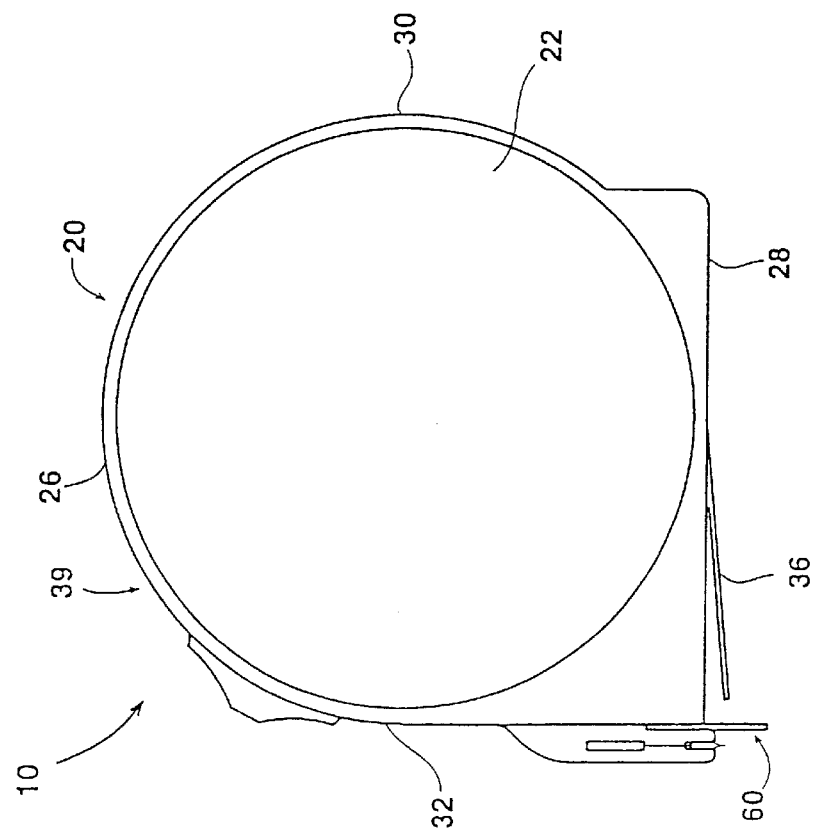
FIG. 17 is a front view of a fifth embodiment of the present invention showing a dual means for marking with a flexible housing bottom.

Referring now to FIGS. 22–23, the tape tip 60 comprises a means for hooking including a hooking portion 62 that extends at an essentially right angle from the mounting portion 66 of the tape tip 60. Preferably, the tape tip 60 extends below the bottom 28 of the housing, as shown in FIG. 17 to allow the hooking part 62 to easily engage the edge 162 of the surface to be measured and marked 160. As seen in FIG. 15, the tape tip 60 may be of an asymmetrical shape to allow for increased engagement of the tape tip 60 to the surface to be measured and marked 160.

Figure 16:
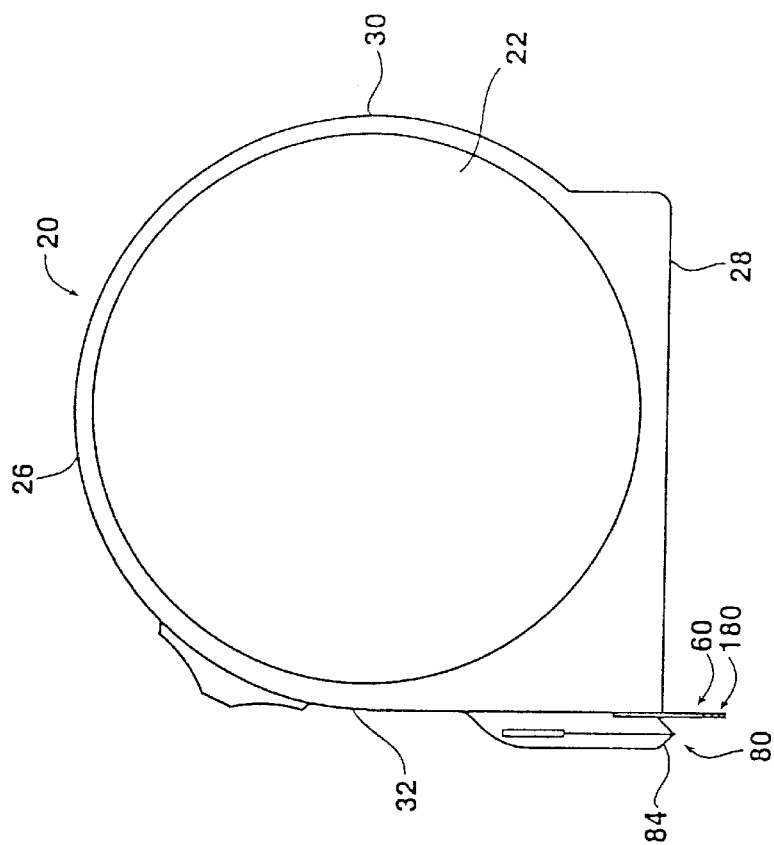
FIG. 16 is a side view of the embodiment shown in FIG. 15.

Optionally, the tape tip 60 may include a mark making means 180, for instance as shown in FIGS. 15–16, 22–23. In FIGS. 15 and 16, the means for marking 80 may be a serrated edge or the edge of the tape tip 60 itself may be embedded with a mark making means such as diamond particles or a means for leaving a mark. Whereas in FIGS. 21–23, the tape tip 60 itself may include a mark making means 180.

Figure 33:
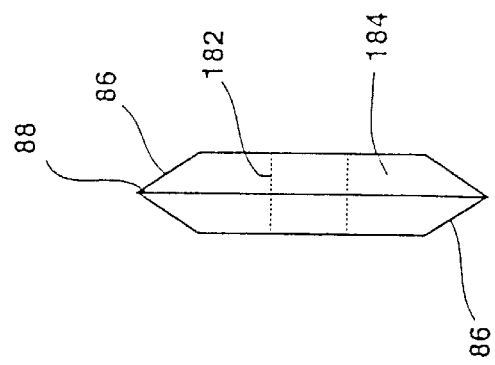
FIG. 33 is a front view of the means for marking shown in FIG. 31.
Figure 32:
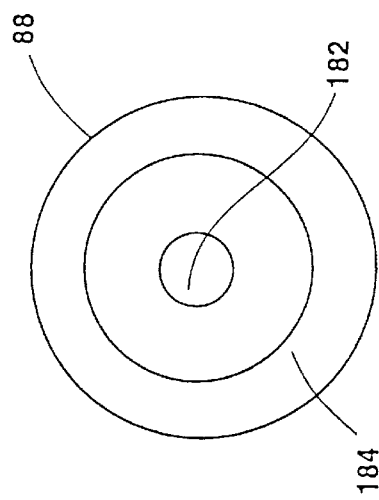
FIG. 32 is a side view of the means for marking shown in FIG. 31.
Figure 31:
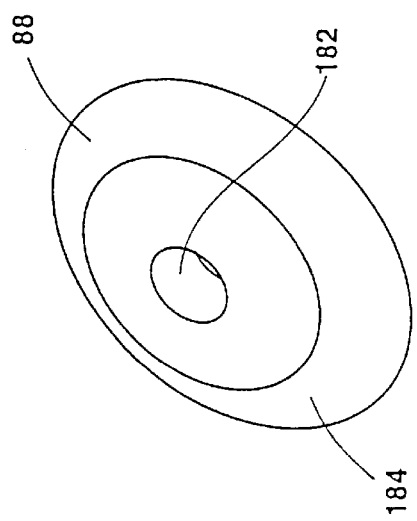
FIG. 31 is a perspective view of one embodiment of the means for marking.

In FIGS. 21–23, the means for marking 180 preferably comprises a circular shaped wheel 184 or portion thereof. It is preferred that the means for marking 180 be made of a rigid material such as metal, plastic or a mark making composite. The wheel 184 preferably has an aperture 182 for mating with an axle. The axle 100 is preferably an elongated cylindrical shape. Likewise, this tape tip 60 has a hooking portion 62 and a mounting portion 66. This means for marking 180 able to be configured for applying a mark as any other means for marking 80, 180 disclosed herein. The preferred embodiment of a wheel 184 utilized with the present invention can be found in FIGS. 31–33. The wheel 84 of the present invention may be likewise shaped.

Figure 7:
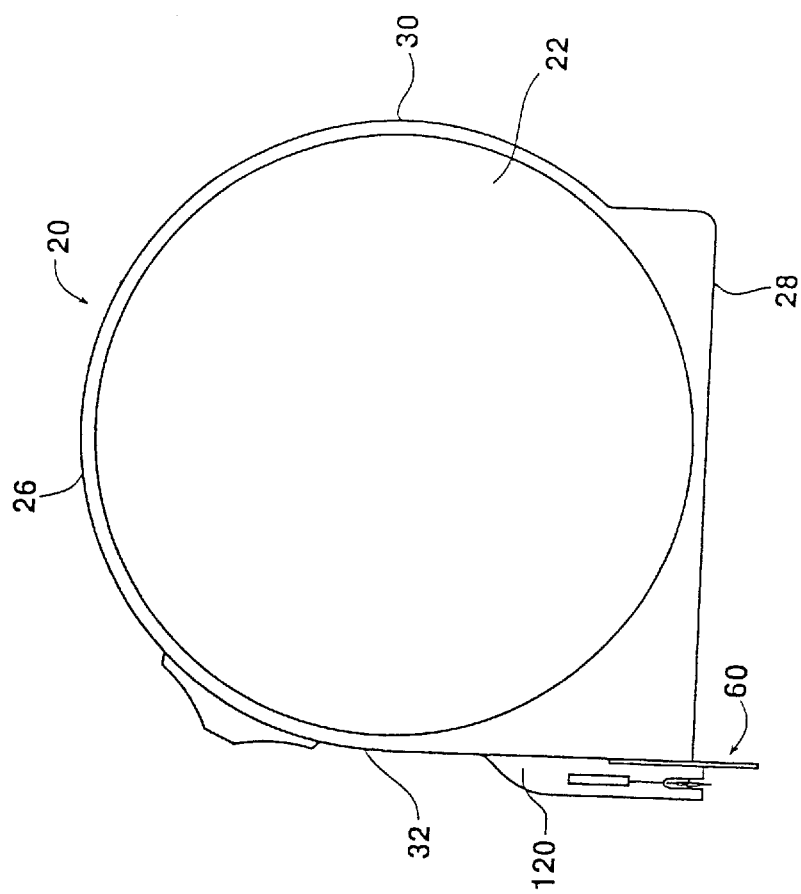
FIG. 7 is a side view of the embodiment shown in FIG. 6.
Figure 6:
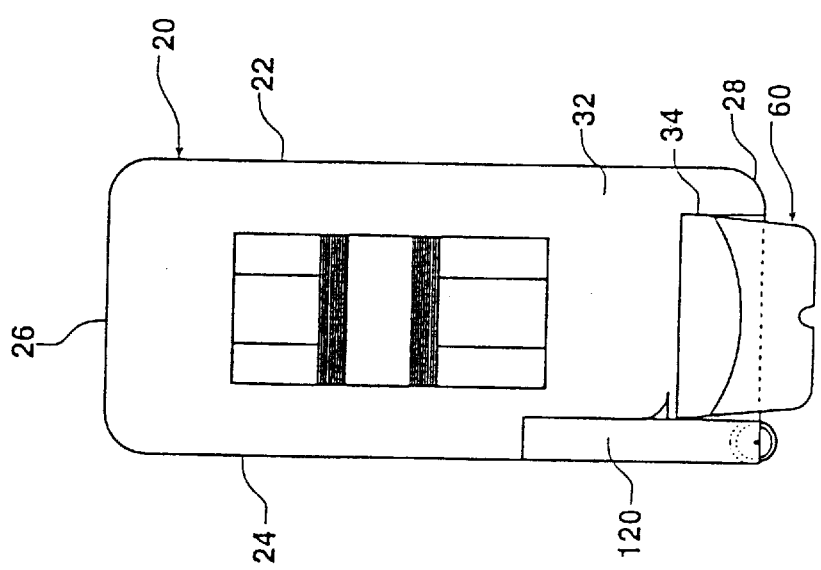
FIG. 6 is a front view of a second embodiment of the present invention.

Referring now to FIGS. 6–7, shown is another embodiment of the present invention. This embodiment having a housing 20, a tape blade aperture 34, and a tape terminating in a tape tip 60. This embodiment having a means for marking holder 120 which is integral with the housing 20. This is in contrast to a holder which is attached to the housing, as shown in FIG. 1. These figures show that the holder may either be formed within the housing of a tape measure, or configured for attachment to an existing tape measure. This integral holder 120 rendition is likewise shown in FIGS. 15 and 16.

Figure 9:
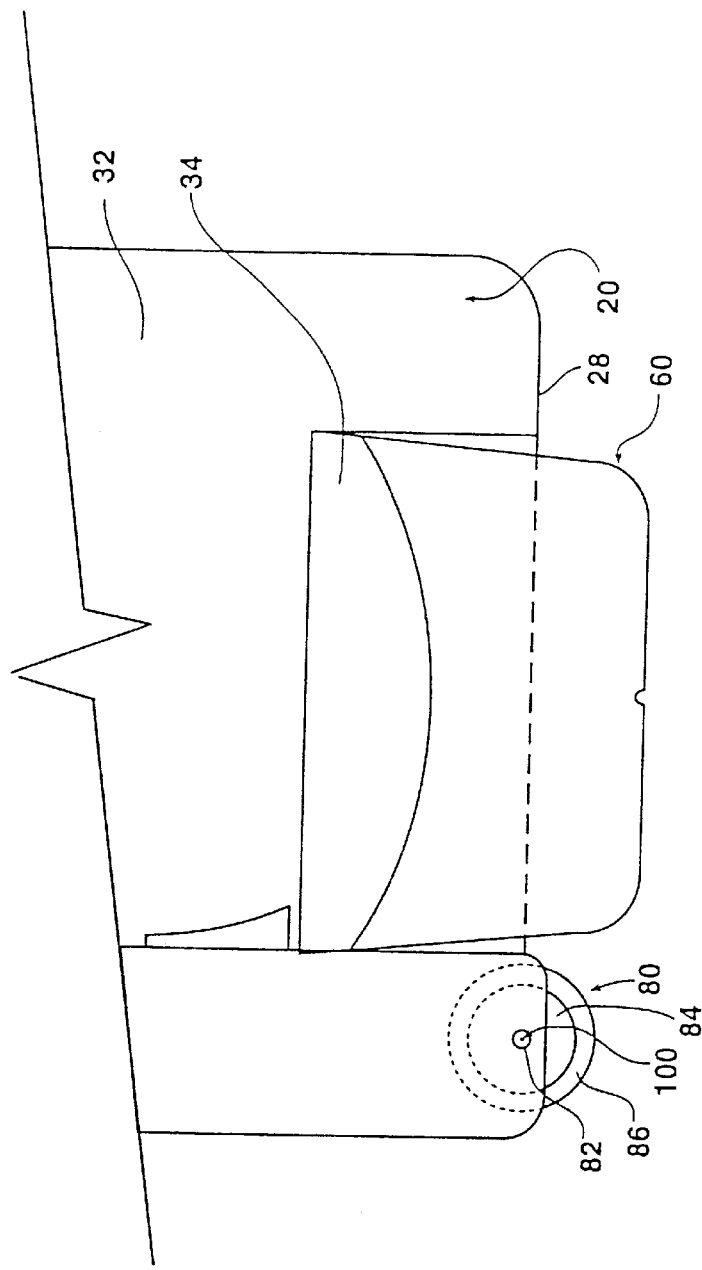
FIG. 9 is a partial, close-up front view of the embodiment shown in FIG. 6.
Figure 8:
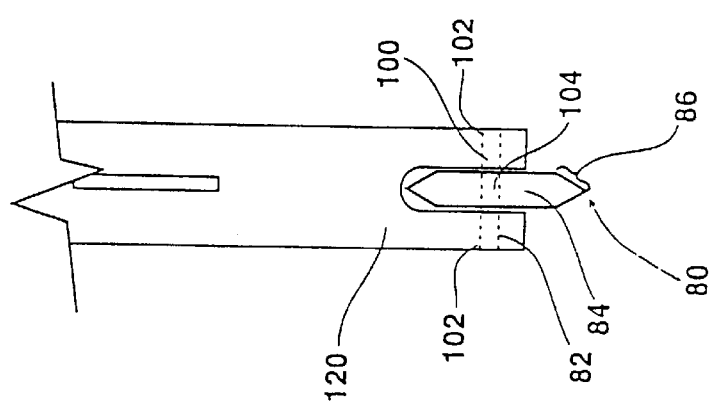
FIG. 8 is a partial side, close-up view of the marking/cutting device of the embodiment shown in FIG. 6.

Referring now to FIGS. 8 and 9, the preferred means for marking 80 comprises a circular wheel 84. Other shapes and configurations are also possible. It is preferred that the means for marking 80 be made of a rigid material such as metal, plastic or of a mark making composite, however other materials are also possible. The preferred wheel 84 having an aperture 82 for mating with an axle 100. This axle 100 having axle protrusions or ends 102 configured for rotational engagement with the holder 120. The wheel 84 being preferably mounted at or near the center or middle 104 of said axle 100.

As seen in FIGS. 8–9 and 31–33, the means for marking 80 may be hardened and/or ground at an angle 86, similar to a glass cutting wheel. This angle 86 may be configured to provide a narrow, accurate mark or may be configured and sharpened to actually serve as a cutting wheel. Thus, "marking" is intended to include marking by cutting. Also, the impression wheel 84, preferably has a rim 88 for contacting the surface to be marked, at least a portion of this rim extending out of the enclosure/holder 120.

The axle 100 is preferably an elongated cylindrical shape, as shown in FIGS. 8–9. This axle 100 being preferably made of a rigid material such as metal or plastic. The means for marking 80 of FIG. 8, having an axle 100, a middle 104, and two ends 102. The axle 100 may be integral to the means for marking 80 or the holder 120 or the housing 20.

The holder 120 is preferably an elongated square or a right rectangular parallelepiped shape. The holder 120 having a means of attachment to the housing in one embodiment.

Examples of such attachment include adhesives, snap fits, magnets, etc. In other embodiments, the holder 120 is integral with the housing, being formed into the housing during or after manufacture. The housing preferably has a protruding cursor 124 that is in alignment with a means for holding a marking wheel parallel to the face of the housing and at a precise position to the bottom of the housing.

Figure 24:
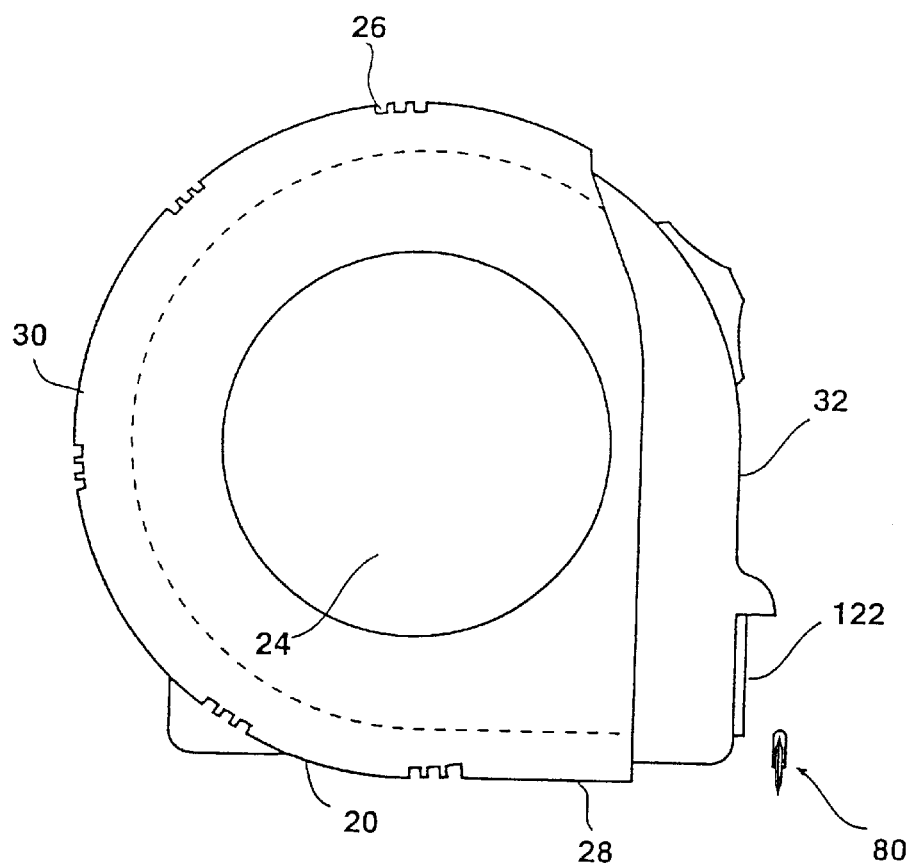
FIG. 24 is a side view of one embodiment of the housing with means for attachment.
Figure 25:
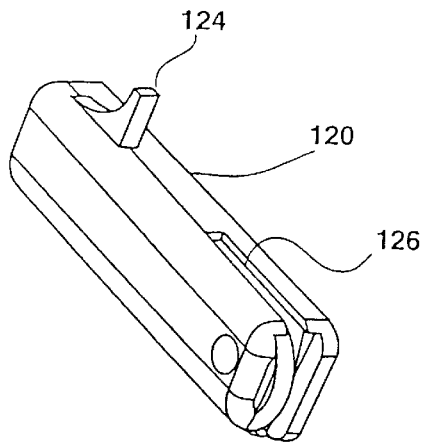
FIG. 25 is a perspective view of one embodiment of the means for holding and the means for marking.
Figure 26:
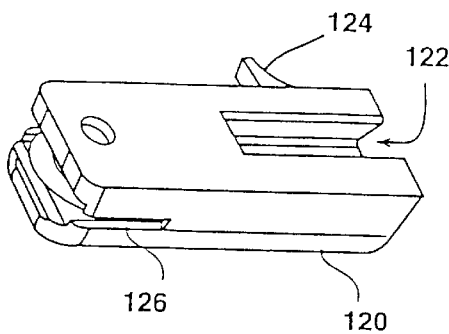
FIG. 26 is a perspective view of the means for holding and the means for marking shown in FIG. 25.
Figure 27:
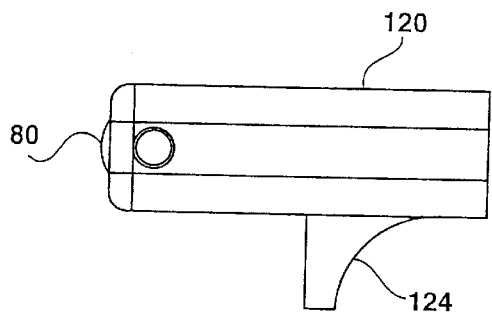
FIG. 27 is a front view of the means for holding and the means for marking shown in FIG. 25.
Figure 28:
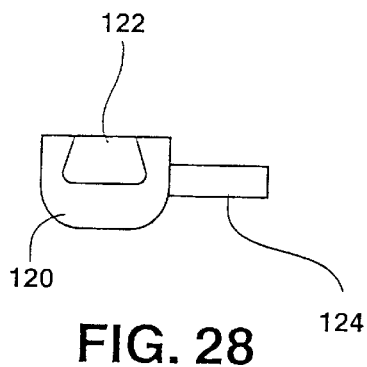
FIG. 28 is a top view of the means for holding and the means for marking shown in FIG. 25.
Figure 29:
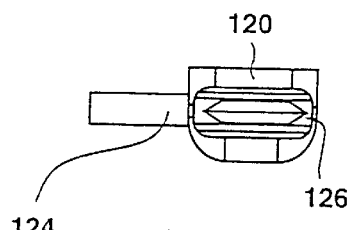
FIG. 29 is a bottom view of the means for holding and the means for marking shown in FIG. 25.
Figure 30:
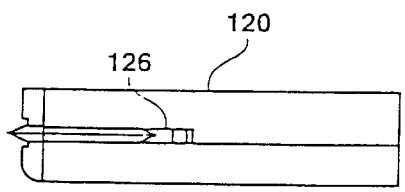
FIG. 30 is a side view of the means for holding and the means for marking shown in FIG. 25.

As shown in FIGS. 25–30, the holder 120 is preferably an elongated square (right rectangular parallelepiped) in shape. Other shapes are also possible. The holder 120 preferably has a cavity 126 for nesting of the means for marking 80. The holder 120 preferably has a means of attachment 122 to the housing 20, one example of which is shown in FIG. 24. The housing 120 preferably has a protruding cursor 124 that is in alignment with a marking wheel of the means for marking 80. This cursor being generally parallel to the face of the housing 20 and generally perpendicular to the means for measuring 40.

Figure 18:
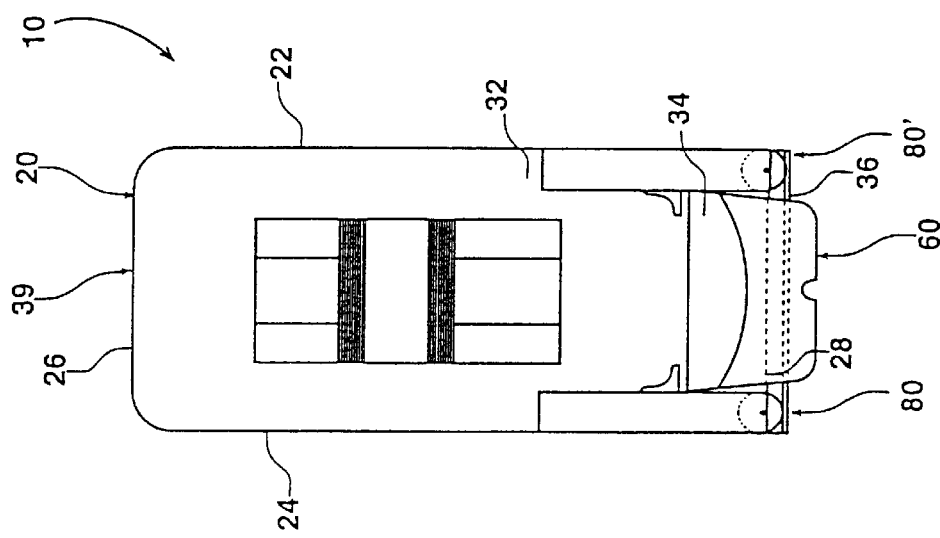
FIG. 18 is a side view of the embodiment shown in FIG. 17 showing a dual means for marking with a flexible housing bottom.

As shown in FIGS. 17 and 18, any means for holding the means for marking 80 perpendicular to the means for measuring 40 in such a way as to allow engagement of the means for marking 80 with the surface to be measured and marked 160 may be utilized as can be appreciated.

As shown in other embodiments, such as FIGS. 11–14, the bottom wall 28 or a portion thereof (partially sloped base) 29 may be angled in such a way as to allow for engagement of the tape tip 60 to the surface being measured 160 without initiating contact of the means for marking 80 until it is intended. Although one angle is shown, many angles, combinations of angles, cutaways, or geometric reveals or shapes could achieve the desired results as can be appreciated. The preferred angle is between 7° and 9°. As shown, it is preferred that this angular relationship of the wall 28 to the partially sloped base 29 be configured along the base length of the housing. However, any base shape that allows for the engagement of the tape tip 162 to the end 62 without engaging the mark making means 80 will work and are also envisioned.

In such a configuration, the marking tape measure comprises a housing 20 for containing a tape and a marking device 80. This housing 20 having a tape opening or aperture 34 and a top wall or side 26 opposite a bottom wall or side. The bottom side comprising a first longitudinal surface (bottom) 28 obliquely joining a second longitudinal surface (partially sloped base) 29. The tape having measuring indicia thereon, and being extendible through the tape opening in a first direction. The remainder of the tape being coiled within the housing. The marking device thus being connected to the housing in alignment with the second longitudinal surface, configured to extend out of the housing adjacent the second longitudinal surface.

Figure 11:
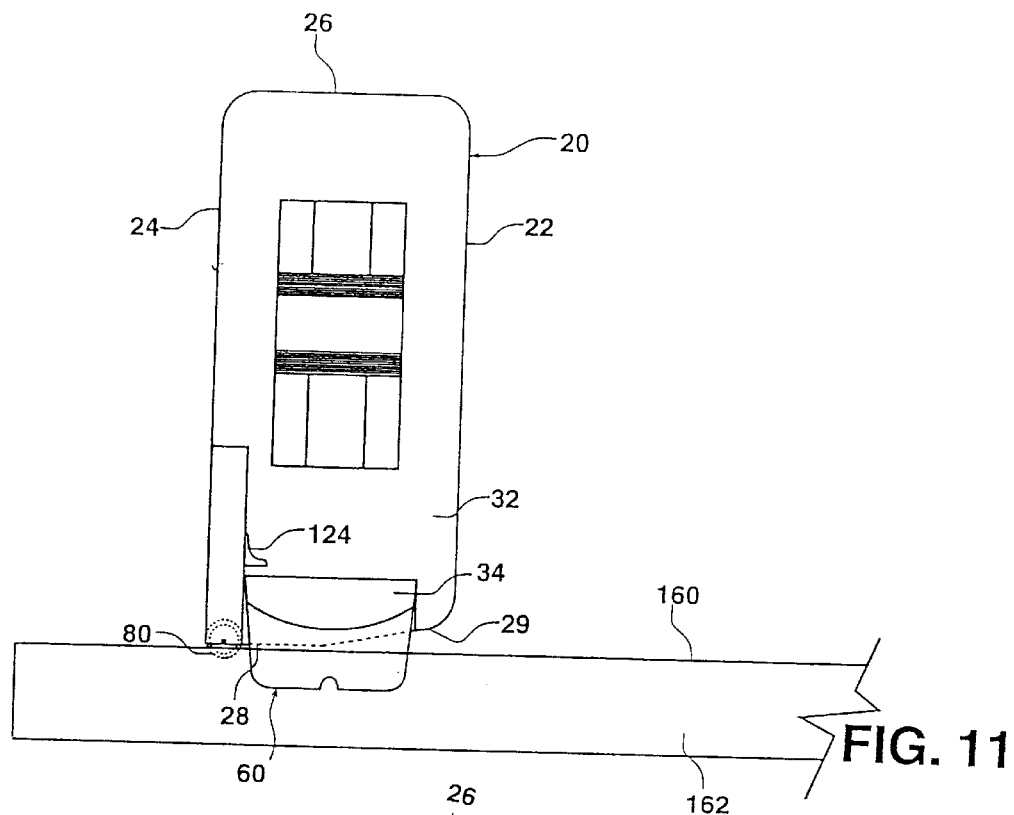
FIG. 11 is a front view of a third embodiment of the present invention in position to measure.
Figure 12:
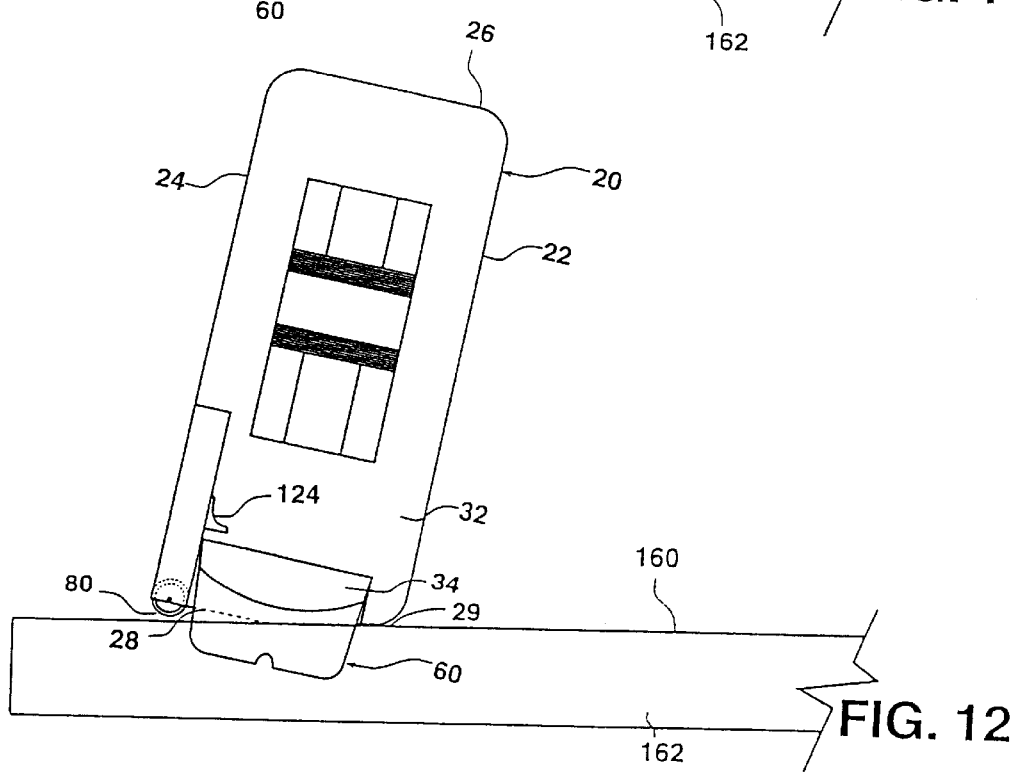
FIG. 12 is a front view of the embodiment shown in FIG. 11 in position to mark.
Figure 14:
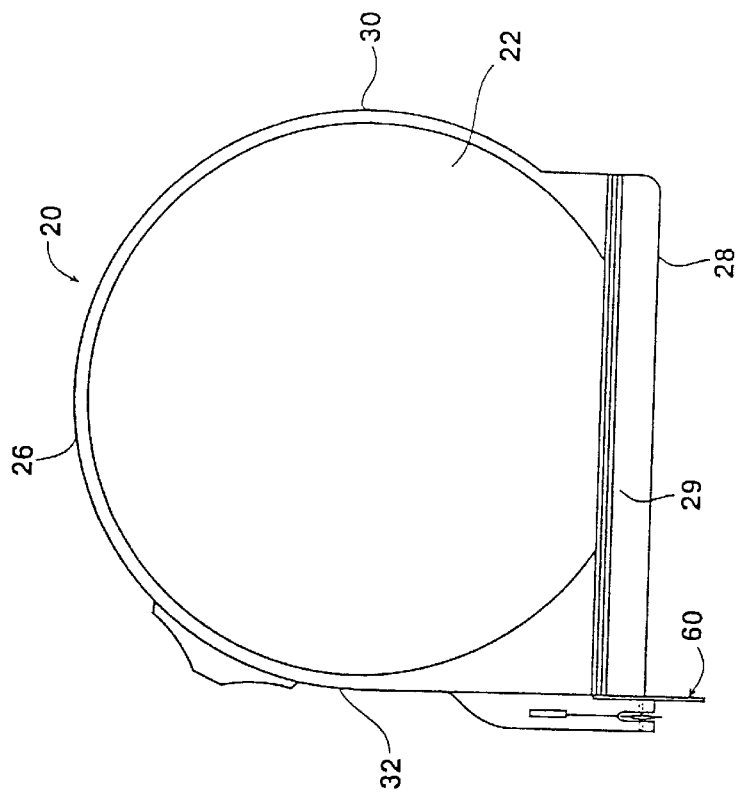
FIG. 14 is a side view of the embodiment shown in FIG. 11 showing the angled bottom of the housing in relationship to the tape tip and the means for marking.
Figure 13:
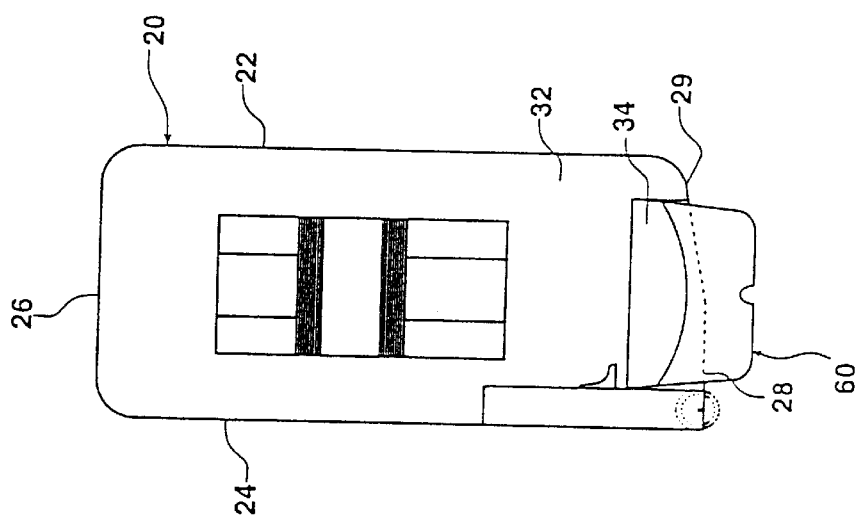
FIG. 13 is a front view of the embodiment shown in FIG. 11 showing the angled bottom of the housing in relationship to the tape tip and the means for marking.

In such a manner, a user could hook the tape tip 60 on the edge or end 162 of the surface to be marked and measured 160. With the housing 20 tilted as shown in FIG. 12, the housing could be slid away from the end 162 thereby extending the tape out of the housing without engaging the means for marking 80. When the desired extended length is reached, the user could right the housing 20 as shown in FIG. 11, thereby allowing the means for marking 80 to engage the surface to be measured and marked.

As shown in FIGS. 17 and 18, the housing 20 may have a ramp 36 is flexible when pressure is applied. This ramp 36 prevents the marking of the surface being measured and marked 160 until the user presses downwards on the housing 20 thereby flexing said ramp 36 and allowing the means for marking 80 (80') to contact the surface to be marked. It is preferred that this ramp 36 be comprised of a resilient material able to return to its original shape after such pressure is removed.

Another variation of the housing may include the inclusion of at least one roller or bearing located on the bottom wall of the housing to facilitate perpendicular movement of the housing, to the means for measuring, against the surface to be measured and marked.

The preferred coiled measuring tape utilized with the present invention is an elongated blade formed of a ribbon of metal or composite material. This blade configured to be coiled on a means for a spool (spool means) with a means to retract (retraction means). This tape measure configuration (spool means with retraction means) is well known in the prior art. As shown in FIGS. 5, 19, 20, 22, and 23 of the drawings, the coiled measuring tape 40 comprises an elongated blade 40 formed of a ribbon of metal or composite material coiled on a means for a spool with a means for retraction. It is clearly anticipated that the coiled ribbon measuring tape 40 may be replaced by other means for measuring including digital, GPS, sonar, laser, magnetic, proximity or any other means for determining distance or position.

Referring now to FIGS. 15–16, the means for marking 80 may not be a wheel, but may be directional in shape. For instance the elongated point of FIG. 16 or the semi-circular shape of the "wheel" 84 of FIG. 15. In such an embodiment, the means for marking 80 would not roll along a surface but be scratched across the surface to be marked, either leaving a mark or creating a groove in the surface to be marked. In such an embodiment, the fact that the means for marking is directional in shape, particularly directional generally perpendicular to the length of the base 28 of the housing, the means for marking is able to travel generally only perpendicularly across the surface of the surface to be marked. A point, or a scribe, does not have this ability. The base 28 itself could have formed therein a directional marking means, for instance a semi-circular ridge.

The ability to make a mark upon the surface to be marked which is generally perpendicular to the distance measured is key to the preferred embodiment of this invention. This is preferably achieved through the marking means being directional so that the marking means will, in use, only apply a mark to the surface which is generally perpendicular to the distance measured (for instance the length of the tape blade). However, other manners may also be utilized to achieve this goal, including manners of restricting the housing itself to perpendicular movement while using a non-directional marking means, for instance one or more wheels located in the base of the measuring device.

As shown in FIG. 18, a particular embodiment may include two or more means for marking 80, 80'. These means for marking 80, 80' could be separate, as shown, or could be joined together. These means for marking 80, 80' are preferably aligned with one another so that side to side movement of the housing 20 will result in a single line marked upon the surface to be marked. Optionally, these means for marking could be slightly staggered so that a differing line style or thickness could be provided.

Referring back to FIG. 1, it is preferred that the tape measures incorporating the present invention be configured for inclusion with a means for locking the tape blade 140. The means for locking the tape blade 140 has a button section 144 that protrudes to the exterior of the housing. This is likewise shown in FIG. 3. There are many alternate means for locking the tape blade 140, and considered by themselves, are conventional means known in the art and are therefore not shown in detail in the drawings. The means for locking the tape blade 140 is preferably contained in the housing 20 with a button 144 that protrudes to the exterior of the housing 20. This means for locking the tape blade 140 configured to engage and lock the tape blade 40.

The surface to be measured and marked 160 can be of any shape or size material that would commonly be measured with said measuring device. The surface to be measured and marked 160 may also be a structure or a combination of materials.

The housing 20 and all the housing sub-components integrally form an enclosure. The coiled measuring tape 40 is retractably contained inside the housing enclosure 20 on a hub with the free end of the coiled measuring tape 40 extending through the housing aperture, attaching to the tape tip 60. The tape tip 60 is integral with the free end of the coiled measuring tape 40.

In the preferred embodiments, the means for marking 80 mates with the middle 104 of the axle 100. As such, the axle 100 protrudes from both sides of the means for marking 80. These axle protrusions 102 are able to be received integrally in the walls of the cavity of the holder 126. The preferred holder 120 includes a means for attachment 122 to the housing 20, and is preferably interconnected with the housing 20. Likewise, the holder may be integral with said housing 20, as shown in FIG. 6.

Figure 10:
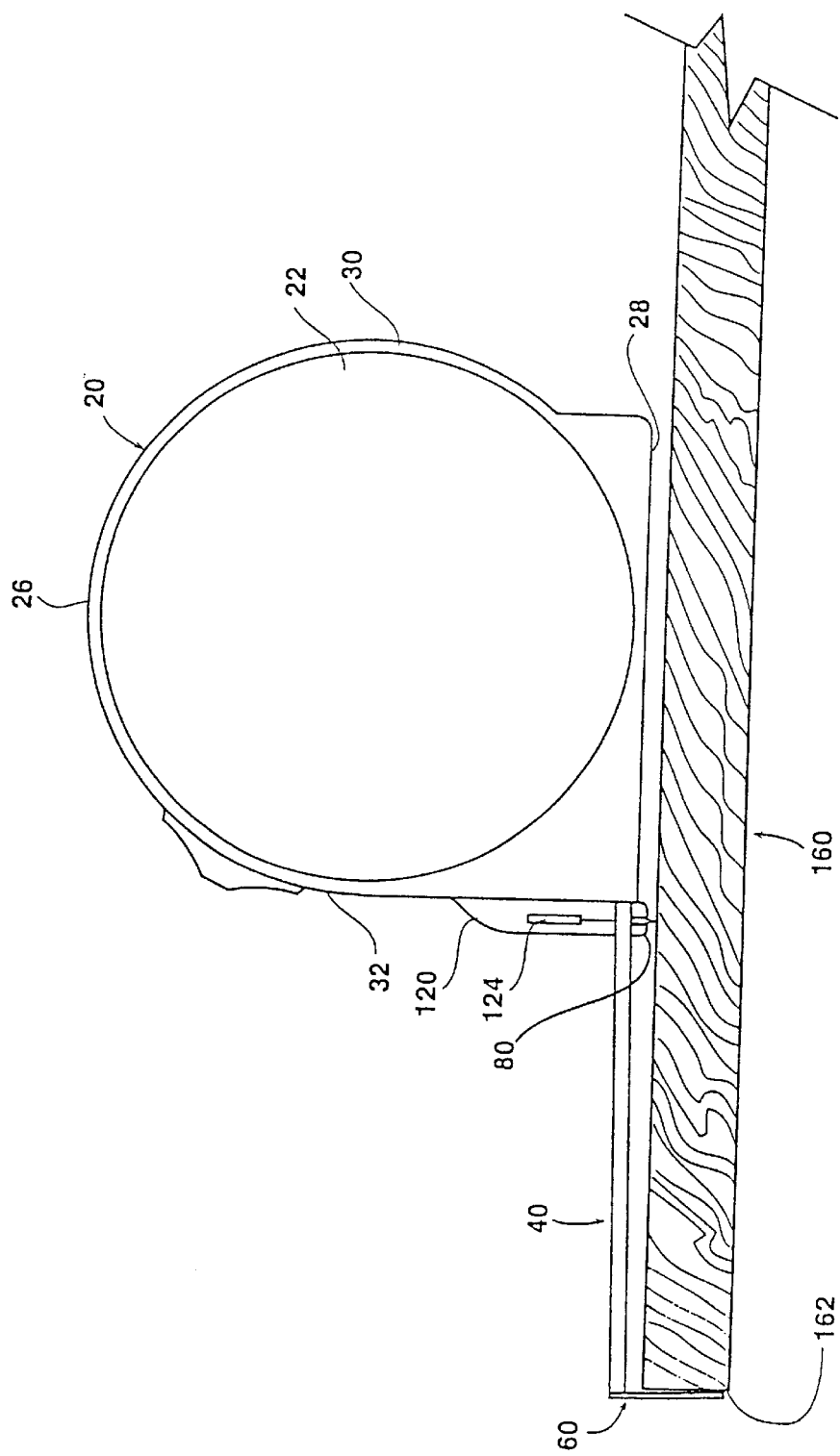
FIG. 10 is a side environmental view of the embodiment shown in FIG. 6 engaging material to be marked.

It is preferred that the holder 120 have a protruding cursor 124 that is integral. This cursor 124 indicating to the user the location of the means for marking 80 to the user. Referring now to FIGS. 5, 10 and 11, in use the housing 20 may be brought into contact with the surface to be measured and marked 160. The tape tip 60 is allowed to engage the edge 162 of the surface to be measured and marked 160, while the housing 20 is pulled across the surface to be measured and marked 160 to the desired location as verified by the cursor 124. The means for marking 80 is then engaged by altering the angle of the housing 20, as shown in FIGS. 11 and 12, and applying downward pressure to the means for marking 80. Due to the generally perpendicular attitude of the means for marking 80 to the means for measuring 40, the desired position of the means for marking 80 is maintained. This is due to the nature of the means for marking 80 being directional and configured for moving forward or backward and not side to side. This is likewise illustrated in FIGS. 5, 10, 12, 15–16, and 19–22.

Figure 34:
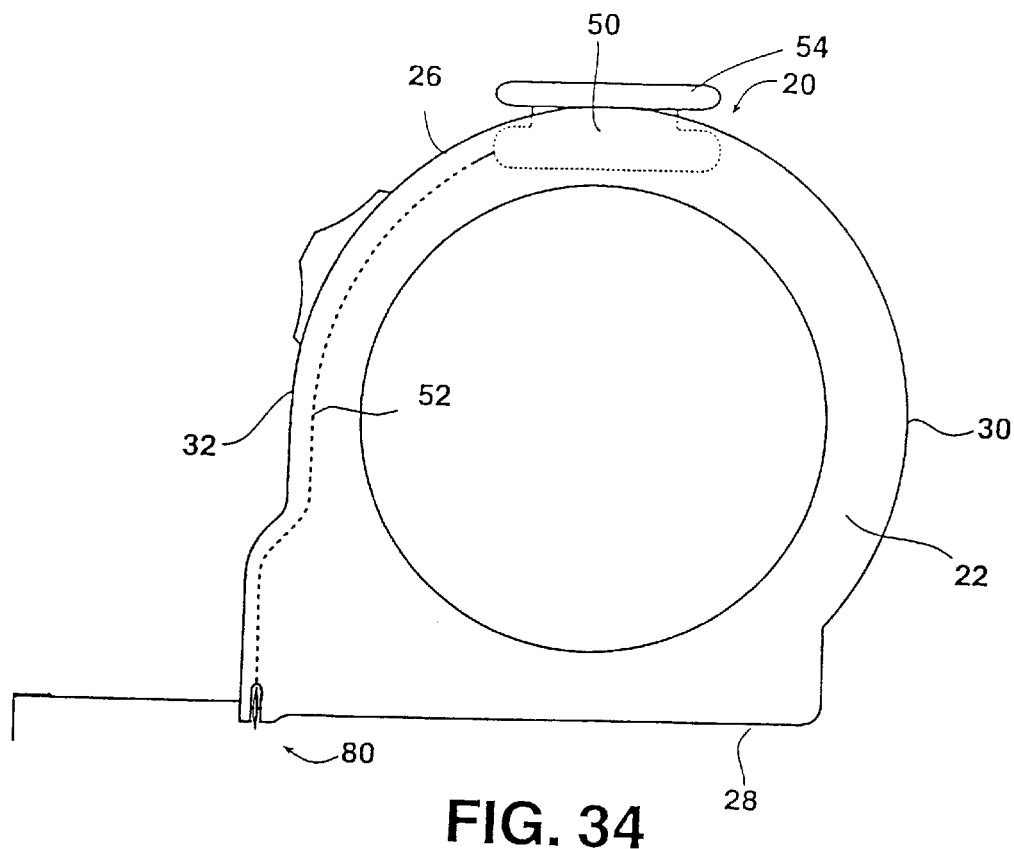
FIG. 34 is a side view of a seventh embodiment of the present invention
Figure 35:
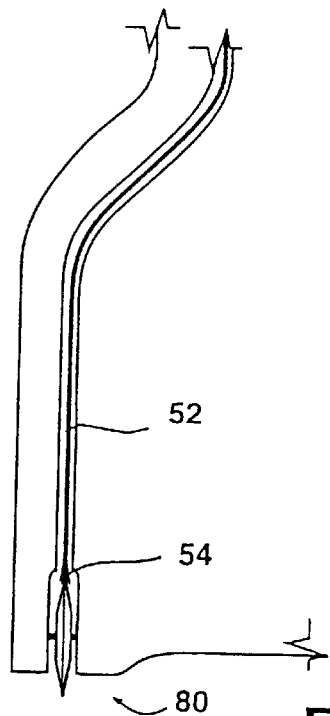
FIG. 35 is a partial, cross-sectional view of the means for marking of FIG. 34.

Referring now to FIGS. 34 and 35, shown is an alternative embodiment of the present invention. In this embodiment, a chamber 50 is provided for containing an amount of a liquid, powder or gel (preferably a liquid) marking substance. This chamber or well 50 preferably provided with a closure 54, such as a lid, for allowing additional quantities of the marking substance to be added to the well. The chamber 50 may be of any size or configuration and may be located inside or outside the housing. It may also be integral with the housing or removable as in a cartridge format.

This marking substance being transmitted to the marking means 80 through a channel 52, preferably via a wick to an applicator 54 for applying the marking substance, such as an ink, paint, chemical, etc., to the wheel of the marking means 80. It is preferred that in such an embodiment that a wick be employed to transfer the marking substance with the end of the wick comprising the applicator. The rotation of the marking means transfers the marking substance to the surface to be marked.

Figure 36:
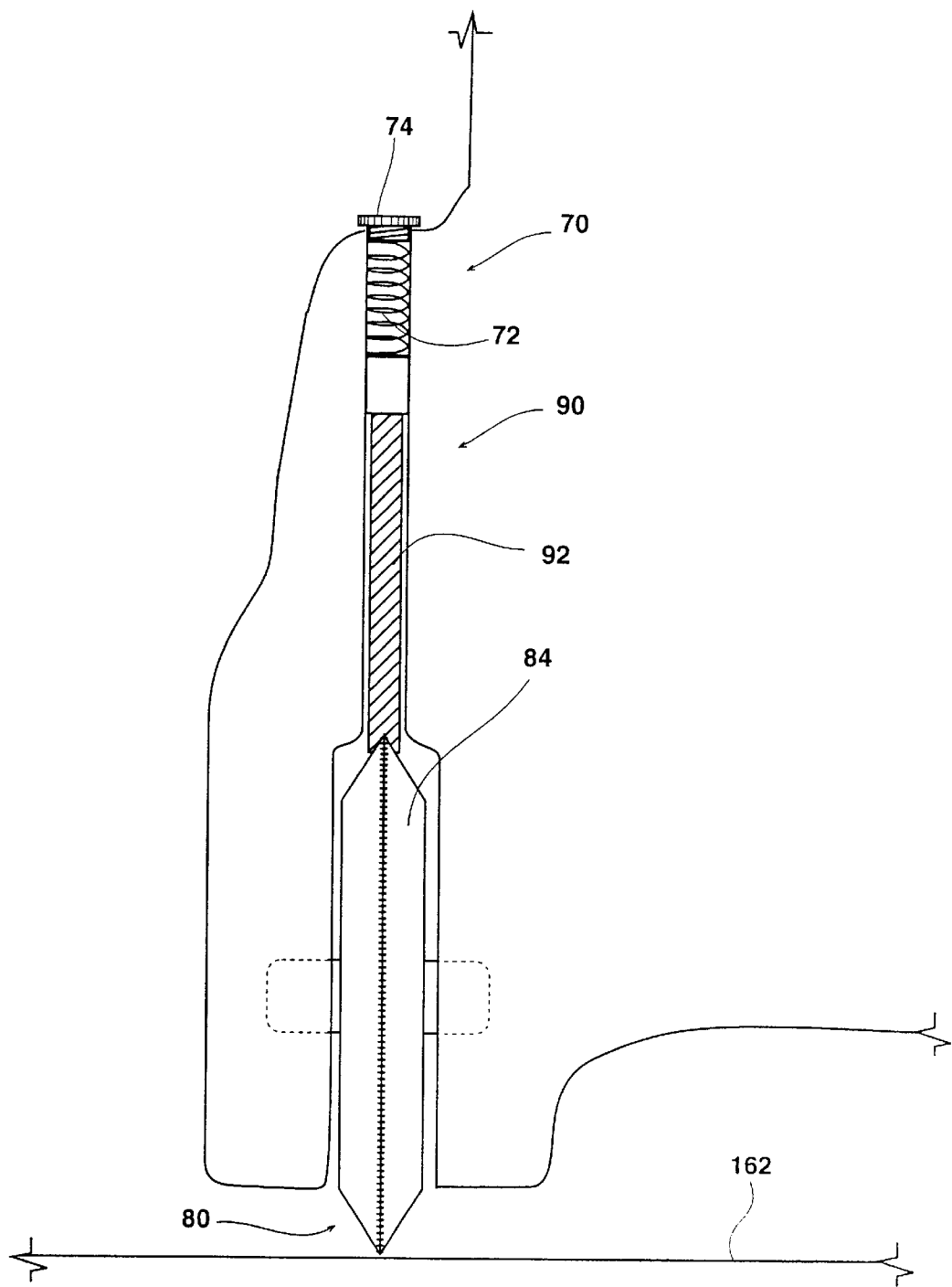
FIG. 36 is a partial, cross-sectional view of another embodiment of a means for marking.

Referring now to FIG. 36, in yet another embodiment of the present invention, a marking applicator could be provided for applying a marking substance, such as graphite, charcoal, wax, chalk, ink, paint, etc., to the means for marking 80. For instance, a pencil lead (graphite) 92 could be held under tension against the surface of the means for marking 80, particularly the wheel 84, which contacts the surface to be marked 160. Thus, rotation of the wheel 84 of the means for marking against the surface to be marked 160 also results in rotation of the wheel 84 of the means for marking against the indicia (marking) applicator 90. This results in the transmission of the marking substance from the marking applicator 90 onto the wheel 84 of the means for marking. Then, continued movement of the means for marking 80 against the surface to be marked 160 results in the transfer of the marking substance to the surface to be marked from the means for marking. Thus, for instance, utilization of the present invention could result in the creation of an ink line along the track of the means for marking.

Additionally, the means for marking utilized with the marking applicator could comprise or be comprised at least partially of, a rubber material or a porous material allowing for easier application of such a marking substance. Such a rubber or porous material would more easily hold and carry to the surface to be marked the marking substance.

Additionally, the marking applicator could be selectively engaged or disengaged by the operator through use of an engagement/disengagement means 70. This would allow the operator or user of the present invention to decide whether to also or instead apply a marking substance to the surface marked. For instance, a spring mechanism 72 could be utilized whereby through pushing a button 74 on the coiled measuring tape the marking applicator could be activated or deactivated.

As the wheel is rolled on the surface to be marked, ink or any other liquid is deposited on the wheel. The wheel, as it rolls, deposits the ink or liquid on to the surface to be marked.

The housing 20, the holder 120, and the means for marking 80, may be molded, cast or machined as one component, preferably from a rigid material such as metal, plastic or a mark making composite.

Figure 37:
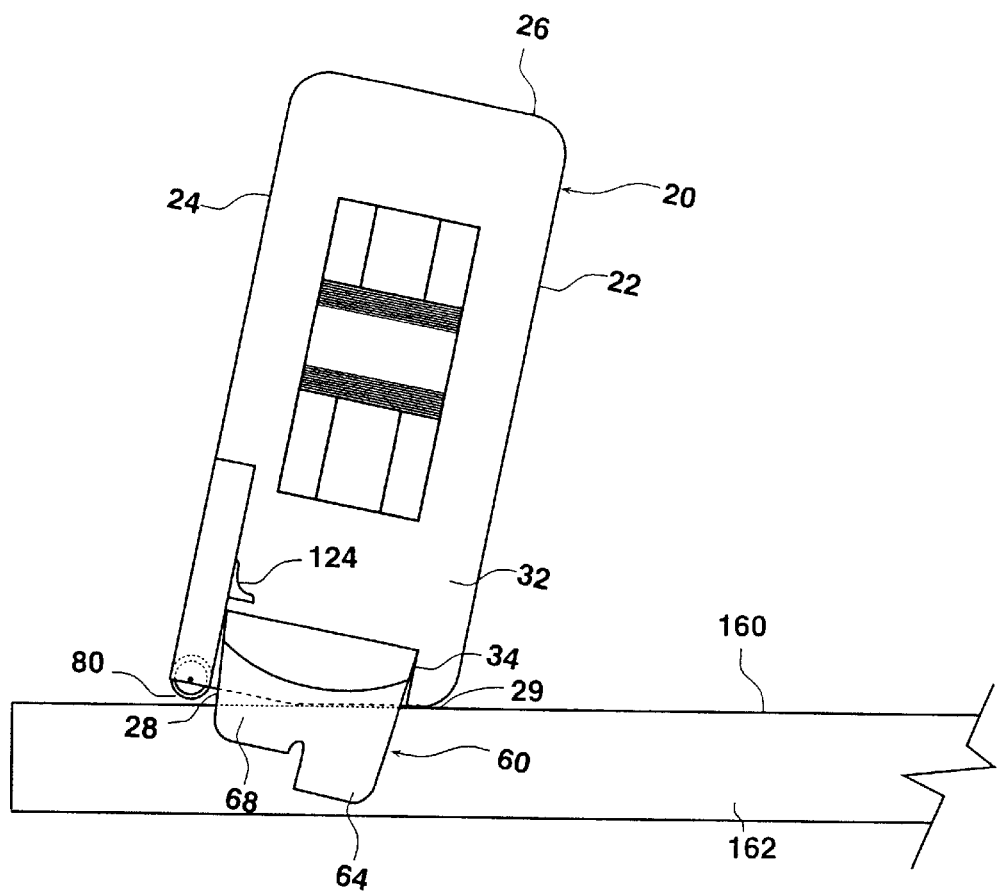
FIG. 37 is a front view of another embodiment of the present invention shown in position to mark.

Referring now to FIG. 37, shown is another embodiment of the present invention. This embodiment having an asymmetrical tape tip 60. This tape tip 60 having one side 64 longer than the other side 68. In such a manner, utilization of the present invention is easier, in that the housing 20 can be tilted as shown in the figure with the tape hook 60 one side 64, being elongated, more easily engaging the end 162 of the surface to be marked and measured 160, thereby allowing the device to be utilized without engaging the marking device 80.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A marking device for use with a tape measure of the type having a housing with an opening therein through which a portion of a tape having measuring indicia thereon is extendible in a first direction with the remainder of the tape being coiled in said housing, said marking device comprising:

an enclosure attached to said housing for containing said marking device therein;

an impression wheel for applying a mark to a surface, said impression wheel rotationally disposed on an axle mounted within said enclosure, said impression wheel having a rim for contacting said surface, said rim extending out of said enclosure; and a marking substance applicator for applying a marking substance to said rim for application to said surface.

2. The marking device of claim 1, wherein said wheel contacts an indicia applicator whereby a marking substance is applied to the rim of said wheel and said wheel is configured to transfer said substance as a mark to the material being marked.

3. The marking device of claim 1, wherein said wheel is disposed generally perpendicular to said first direction.

4. A marking tape measure comprising:

a housing for containing a measuring tape therein;

a measuring tape having measuring indicia thereon; and a marker attaching to said housing, said marker comprising an impression wheel for rotationally applying a mark to a surface to be marked, a marking substance well for containing a marking substance, and a wick for transferring said marking substance from said marking substance well to said an indicia applicator, said impression wheel configured to contact said indicia applicator whereby said marking substance is thereby applied to the rim of said wheel and said wheel is configured to transfer said marking substance as a mark to the surface being marked.

5. The marking device of claim 4, wherein said wheel is disposed generally perpendicular to said first direction.

6. A marking tape measure comprising:

a housing for containing a measuring tape therein;

a measuring tape having measuring indicia thereon; and a marker attaching to said housing, said marker comprising an impression wheel for rotationally applying a mark to a surface to be marked, a marking applicator for applying a marking substance to said impression wheel, said marking substance held under tension by said marking applicator to said impression wheel, said impression wheel configured to contact said marking applicator whereby said marking substance is thereby applied to the rim of said wheel and said wheel is configured to transfer said marking substance as a mark to the surface being marked.

7. The marking device of claim 6, wherein said wheel is disposed generally perpendicular to said first direction.

* * * * *